United States Patent
Fujita

(10) Patent No.: US 11,698,267 B2
(45) Date of Patent: Jul. 11, 2023

(54) VEHICLE NAVIGATION DEVICE

(71) Applicant: TOYOTA JIDOSHA KABUSHIKI KAISHA, Toyota (JP)

(72) Inventor: Takuya Fujita, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 22 days.

(21) Appl. No.: 17/006,946

(22) Filed: Aug. 31, 2020

(65) Prior Publication Data

US 2021/0140781 A1 May 13, 2021

(30) Foreign Application Priority Data

Nov. 11, 2019 (JP) .................................. 2019-203863

(51) Int. Cl.
*G01C 21/36* (2006.01)
*G01C 21/34* (2006.01)

(52) U.S. Cl.
CPC ....... *G01C 21/367* (2013.01); *G01C 21/3453* (2013.01); *G01C 21/3664* (2013.01)

(58) Field of Classification Search
CPC .............. G01C 21/367; G01C 21/3453; G01C 21/3664
See application file for complete search history.

(56) References Cited

U.S. PATENT DOCUMENTS

2001/0025222 A1* 9/2001 Bechtolsheim .... G01C 21/3685 340/995.22
2005/0021227 A1* 1/2005 Matsumoto ........ G01C 21/3415 701/431
2009/0171567 A1 7/2009 Morimoto et al.
2010/0114477 A1* 5/2010 Yeh .......................... G01C 21/26 701/533
2011/0196606 A1* 8/2011 Bruelle-Drews .... G08G 1/0969 701/533
2017/0350709 A1* 12/2017 Zhou .................. G01C 21/3673
2018/0357900 A1* 12/2018 Wang ..................... G06Q 20/00
(Continued)

FOREIGN PATENT DOCUMENTS

JP 2000337917 A * 12/2000
JP 2002243471 A * 8/2002
(Continued)

OTHER PUBLICATIONS

Machine Translation of JP2000337917A (Year: 2000).*
(Continued)

*Primary Examiner* — Faris S Almatrahi
*Assistant Examiner* — Sahar Motazedi
(74) *Attorney, Agent, or Firm* — Oliff PLC

(57) ABSTRACT

The vehicle navigation device guides a user of a vehicle to a destination. The vehicle navigation device includes a car navigation system that acquires the destination, a head-up display that displays various information, and a body ECU that controls the information displayed on the head-up display based on the destination acquired by the car navigation system. The body ECU is configured to cause, on the assumption that the user alights from the vehicle at a current location, the head-up display to display post-alighting guidance information which is information for guiding the user to the destination regarding, for example, walking.

12 Claims, 7 Drawing Sheets

(56) References Cited

U.S. PATENT DOCUMENTS

2019/0063947 A1* 2/2019 Beaurepaire ....... G01C 21/3685
2019/0360837 A1 11/2019 Matsumoto et al.

FOREIGN PATENT DOCUMENTS

| | | | | |
|---|---|---|---|---|
| JP | 2004-325181 | A | | 11/2004 |
| JP | 2004-361105 | A | | 12/2004 |
| JP | 2004-361325 | A | | 12/2004 |
| JP | 2004361105 | A * | | 12/2004 |
| JP | 3896728 | B2 * | 3/2007 | ......... G01C 21/3688 |
| JP | 2009-162568 | A | | 7/2009 |
| JP | 2010-281722 | A | | 12/2010 |
| JP | 2010281722 | A * | | 12/2010 |
| JP | 2013-083486 | A | | 5/2013 |
| JP | 2014-163793 | A | | 9/2014 |
| JP | 2015-190759 | A | | 11/2015 |
| JP | 2018-115980 | A | | 7/2018 |
| JP | 2019194536 | A * | | 11/2019 |
| KR | 20160021509 | A * | | 2/2016 |
| TW | 200949209 | A * | | 12/2009 |

OTHER PUBLICATIONS

Machine Translation of JP2010281722A (Year: 2010).*
Machine Translation of JP2002243471A (Year: 2002).*
Machine Translation of KR20160021509A (Year: 2016).*
Machine Translation of JP3896728B2 (Year: 2007).*
Machine Translation of JP2019194536A (Year: 2019).*
Machine Translation of TW200949209A (Year: 2009).*
Machine Translation of JP-2004361105-A (Year: 2004).*

* cited by examiner

FIG. 5

| ARROW | ⇐ | ⇐ | ⇐ | ⇐ |
|---|---|---|---|---|
| COLLOR OF ARROW | RED | YELLOW | BLUE | YELLOW |
| OUTSIDE TEMPERATURE | 40°C | 30°C | 25°C | 25°C |
| WEATHER | FINE | FINE | CLOUDY | RAIN |
| DISTANCE | 5KM | 2KM | 1KM | 1KM |
| REQUIRED TIME | 40MIN | 25MIN | 13MIN | 13MIN |

FIG. 6

| | WINTER | | | AUTUMN | | | SPRINTER | | | SUMMER | | |
|---|---|---|---|---|---|---|---|---|---|---|---|---|
| OUTSIDE TEMPERATURE | BELOW FREEZING POINT TO 10°C | | | 11°C TO 18°C | | | 19°C TO 27°C | | | 28°C OR HIGHER | | |
| WEATHER | FINE | CLOUDY | RAIN | FINE | CLOUDY | RAIN | FINE | CLOUDY | RAIN | FINE | CLOUDY | RAIN |
| DISTANCE (km) | LESS THAN 1 | 1 TO LESS THAN 3 | 3 OR MORE | LESS THAN 1 | 1 TO LESS THAN 3 | 3 OR MORE | LESS THAN 1 | 1 TO LESS THAN 3 | 3 OR MORE | LESS THAN 1 | 1 TO LESS THAN 3 | 3 OR MORE |
| TOTAL POINT | 10 | 6 | 0 | 15 | 13 | 5 | 15 | 13 | 5 | 5 | 8 | 0 |

VEHICLE NAVIGATION DEVICE

CROSS-REFERENCE TO RELATED APPLICATION

This application claims priority to Japanese Patent Application No. 2019-203863 filed on Nov. 11, 2019, incorporated herein by reference in its entirety.

BACKGROUND

1. Technical Field

The present disclosure relates to a vehicle navigation device mounted on a vehicle, and particularly to a vehicle navigation device that guides a user of the vehicle to a destination.

2. Description of Related Art

An existing technology includes vehicle navigation that is installed in a vehicle and guides the vehicle to a destination, and walking navigation that is installed in a portable terminal and guides a pedestrian to a destination. Furthermore, a navigation system which uses vehicle navigation in a driving section of the vehicle while using the walking navigation in a walking section after parking is also well-known.

For example, Japanese Unexamined Patent Application Publication No. 2018-115980 (JP 2018-115980 A) discloses a navigation system in which a portable terminal determines a parking lot where a vehicle is parked and a walking navigation starting point when a user inputs a walking navigation destination to the portable terminal, whereby an in-vehicle device communicably connected to the portable terminal guides the vehicle to a vehicle navigation destination when the user approaches the vehicle, while the in-vehicle device transmits a parking arrival notification to the portable terminal and the portable terminal displays walking navigation information on a terminal display when the vehicle arrives at the vehicle navigation destination.

SUMMARY

However, the navigation system of JP 2018-115980 A described above may have shortcomings in a case where the user has to find another parking space around the destination because the parking space determined by the portable terminal is not vacant but the user is not familiar with the area around the destination.

In other words, in such a case, the guidance information including, for example, a time required to arrive at the destination from the found parking space by walking or a direction from the found parking space to the destination, is not presented to the user. Therefore, problems may occur such as it being difficult for the user to decide whether to use the parking space, or that the user does not know a direction in which he/she should go after alighting from the vehicle.

Furthermore, in such a case, the user has to take out the portable terminal every time he/she newly inputs information on the parking space found by him/her or looks at the map in order to acquire the guidance information from such a parking space, thereby frustrating the user frustration.

The present disclosure is intended to address such shortcomings, and an objective of the present disclosure is to provide a vehicle navigation device which enables the user to easily determine a parking space without feeling frustrated and can help the user to get to his/her destination without getting lost after the user alights from the vehicle even in a case where the user is not familiar with the place around the destination.

In order to achieve the objective stated above, the vehicle navigation device according to the present disclosure causes an in-vehicle display unit to display, to the user, guidance information for guiding to a destination based on a current location of a vehicle before the user alights from the vehicle.

Specifically, the present disclosure is related to the vehicle navigation device that guides a user of a vehicle to the destination.

The vehicle navigation device includes an acquisition unit that acquires the destination, a display unit that displays various information, and a display control unit that controls the information displayed on the display unit based on the destination acquired by the acquisition unit. The units are in-vehicle devices. The display control unit is configured to cause, on the assumption that the user alights at a current location, the display unit to display post-alighting guidance information that is information for guiding the user to the destination regarding a form of transportation after the user alights from the vehicle.

In the present disclosure, examples of "the form of transportation after the user alights from the vehicle" include walking, bicycles, wheelchairs, and Ultra Lightweight Vehicles.

With this configuration, the guidance information (post-alighting guidance information) for guiding to the destination regarding the form of transportation after the user alights from the vehicle is displayed on the in-vehicle display unit on the assumption that the user alights at the current location (the parking space or in the vicinity of the parking space) when the user finds the parking space around the destination. Therefore, the present disclosure enables the user to easily determine whether the found parking space should be used, and can help the user to get to his/her destination without getting lost after alighting from the vehicle even in a case where the user is not familiar with the place around the destination.

Moreover, such post-alighting guidance information is displayed on the in-vehicle display unit without requiring a new operation by the user, thus it is not necessary to take out the portable terminal, thereby decreasing the degree of frustration felt by the user.

In the vehicle navigation device stated above, the post-alighting guidance information may include at least a required time period to arrive at the destination from the current location by the form of transportation, and a direction from the current location to the destination.

With this configuration, the time required to arrive at the destination from the current location by the form of transportation (e.g. walking) is included in the post-alighting guidance information, thus the user is less likely to select a parking space extremely far from the destination. Additionally, the direction from the current location to the destination is included in the post-alighting guidance information, thus the user is less likely to head in a wrong direction after alighting from the vehicle even in a case where he/she is not familiar with the area around the destination.

Further, in the vehicle navigation device stated above, the display control unit may be configured to display the post-alighting guidance information on the display unit when a speed of the vehicle is less than a predetermined speed.

With this configuration, when the vehicle speed is less than the predetermined speed, such as when the vehicle is parked, is stopped while waiting for a signal, or slowly travels while searching for a parking space, the post-alighting guidance information is displayed. Therefore, the user can quickly and easily determine whether to use the found parking space while waiting for a signal or driving slowly.

Meanwhile, when the vehicle speed is equal to or more than the predetermined speed, that is, when the user is not searching for a parking space, the post-alighting guidance information is not displayed. Therefore, the user is less likely to become frustrated due to unnecessary information being displayed.

In the vehicle navigation device stated above, the post-alighting guidance information may include a degree of recommendation for moving from the current location to the destination using the form of transportation.

With this configuration, the degree of recommendation for moving from the current location to the destination by the form of transportation (e.g. walking) is displayed as the post-alighting guidance information. Thus, the user can more easily determine whether to use the found parking space.

In the vehicle navigation device stated above, the degree of recommendation may be calculated based on at least weather information.

With configuration, since the degree of recommendation is calculated based on at least the weather information, it is possible to provide the accurate degree of recommendation in consideration of, for example, weather and outside temperature.

Moreover, in the vehicle navigation device stated above, the display control unit may be configured to represent the degree of recommendations using different colors.

With configuration, since the degree of recommendation is displayed with different colors, the user can intuitively recognize the degree of recommendation even when he/she drives while searching for a parking space, which enables the user to easily determine whether to use the found parking space.

Further, in the vehicle navigation device stated above, the display control unit may be configured to cause the display unit to display guidance information for guiding to the destination regarding the vehicle.

With this configuration, since the guidance information for guiding to the destination regarding the vehicle is displayed on the display unit together with the post-alighting guidance information, the normal vehicle navigation for guiding the vehicle to the destination can be performed.

In addition, when the user drives the vehicle (when the vehicle is stopped or traveling), it is necessary to display various pieces of information on the display unit in addition to the post-alighting guidance information. Nevertheless, if the post-alighting guidance information occupies a large part of a screen of the display unit, it may be difficult to display other information or for the user to see other information.

In the vehicle navigation device stated above, display modes of the post-alighting guidance information may include a normal display mode and a simple display mode that displays a smaller amount of information than the information displayed in the normal display mode, and the display control unit may be configured to, when the vehicle is parked, cause the display unit to display the post-alighting guidance information in the normal display mode, and when the vehicle is stopped or travels at a speed less than the predetermined speed, cause the display unit to display the post-alighting guidance information in the simple display mode.

With this configuration, when the vehicle is stopped or when the vehicle travels at a speed less than the predetermined speed, the post-alighting guidance information is displayed in the simple display mode in which the displayed information has a relatively smaller data amount. In other words, the information that is helpful for the user to determine the parking space is displayed without blocking other displayed information. As such, the frustration of the user can be reduced.

On the other hand, the post-alighting guidance information is displayed in the normal display mode, in which the displayed information has a relatively larger data amount, when the vehicle is parked, that is, when displaying the other information is not as necessary. Thus the user can easily determine whether to use the found parking space, while the user can be helped to get to his/her destination without getting lost after alighting from the vehicle.

In the vehicle navigation device stated above, the normal display mode may include a mode that displays the post-alighting guidance information according to a user's age.

With this configuration, the time required to arrive at the destination from the current location, for example, by walking (form of transportation) is displayed so as to be different for adults and children. Thus the user is less likely to select a parking space within the optimal distance for adults but extremely far from the destination for children.

In the vehicle navigation device stated above, the normal display mode may include a mode that displays the post-alighting guidance information according to the form of transportation.

With this configuration, for example, the time required to arrive at the destination from the current location is displayed depending on whether the form of transportation is by bicycle or by walking, which allows the user to select more accurately.

In the vehicle navigation device stated above, the display control unit may be configured to cause the display unit to display the post-alighting guidance information when it is determined that the current location of the vehicle is within a predetermined radius from the destination.

With this configuration, the post-alighting guidance information is displayed in a case where the vehicle approaches the destination, thus it is possible to provide the post-alighting guidance information to the user at the appropriate timing.

Further, in the vehicle navigation device stated above, the display unit may be a head-up display.

With this configuration, since the post-alighting guidance information is displayed on the head-up display, the user who is driving can easily recognize the post-alighting guidance information while keeping his/her line of sight in front.

As stated above, the vehicle navigation device according to the present disclosure enables the user to easily determine a parking space without feeling frustrated and can help the user to get to his/her destination without getting lost after alighting from the vehicle even in a case where the user is not familiar with the area around the destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a chart illustrating one example of factors to be considered upon calculating a degree of recommendation;

FIG. 6 is a table illustrating one example of a method of calculating the degree of recommendation;

DETAILED DESCRIPTION OF EMBODIMENTS

Hereinafter, embodiments for carrying out the present disclosure will be described with reference to the drawings.

Figure 1:
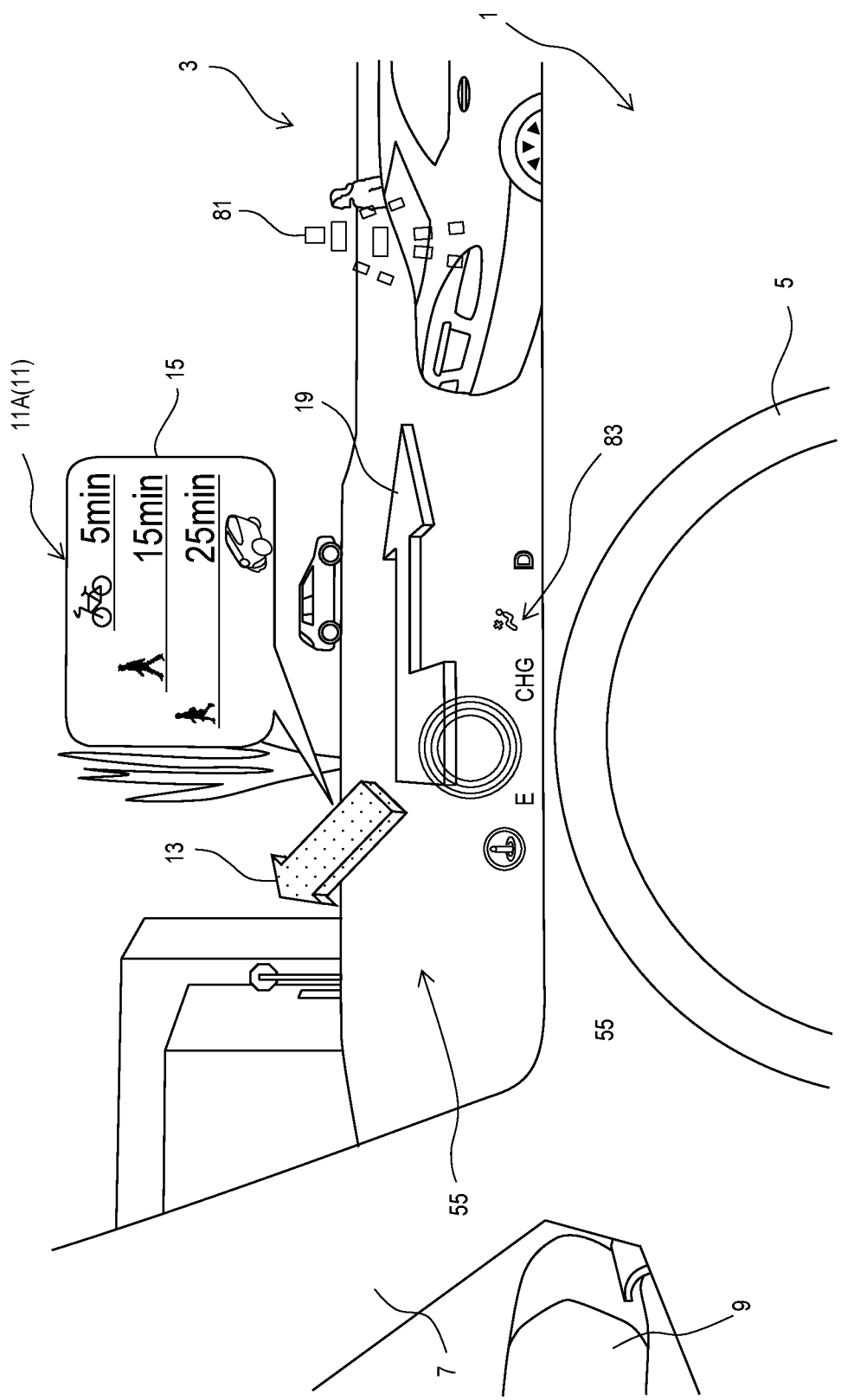
FIG. 1 is a diagram schematically illustrating one example of a display image by a vehicle navigation device according to an embodiment of the present disclosure.

FIG. 1 is a diagram schematically illustrating one example of a display image by a vehicle navigation device 10 (see FIG. 2) according to the present embodiment. In FIG. 1, reference numeral 3 denotes a windshield, reference numeral 5 denotes a steering wheel, reference numeral 7 denotes a front pillar, and reference numeral 9 denotes a side mirror. Further, in the vehicle navigation device 10 of the present embodiment, as will be described below, when the vehicle is stopped or the vehicle travels at a speed less than a predetermined speed, post-alighting guidance information 11 is displayed in a simple display mode 11B (see FIG. 4). However, for better understanding of the display image in FIG. 1, the post-alighting guidance information 11 is intentionally displayed in a normal display mode 11A.

The vehicle navigation device 10 is mounted on a vehicle 1 and is configured such that, as shown in FIG. 1, guidance information (hereinafter also referred to as "vehicle guidance information 19") for guiding to a destination regarding the vehicle 1, indicated by an arrow 19, is displayed on a head-up display 55 installed at the bottom of the windshield 3, and further, guidance information 11 (hereinafter also referred to as "post-alighting guidance information") for guiding to the destination regarding a form of transportation (bicycle or walking) after the user alights from the vehicle, represented by an arrow 13 or a balloon image 15, is also displayed on the head-up display 55, whereby a user of the vehicle 1 is guided to the destination. Hereinafter, such a vehicle navigation device 10 will be described in detail.

Configuration of Vehicle Navigation Device

Figure 2:
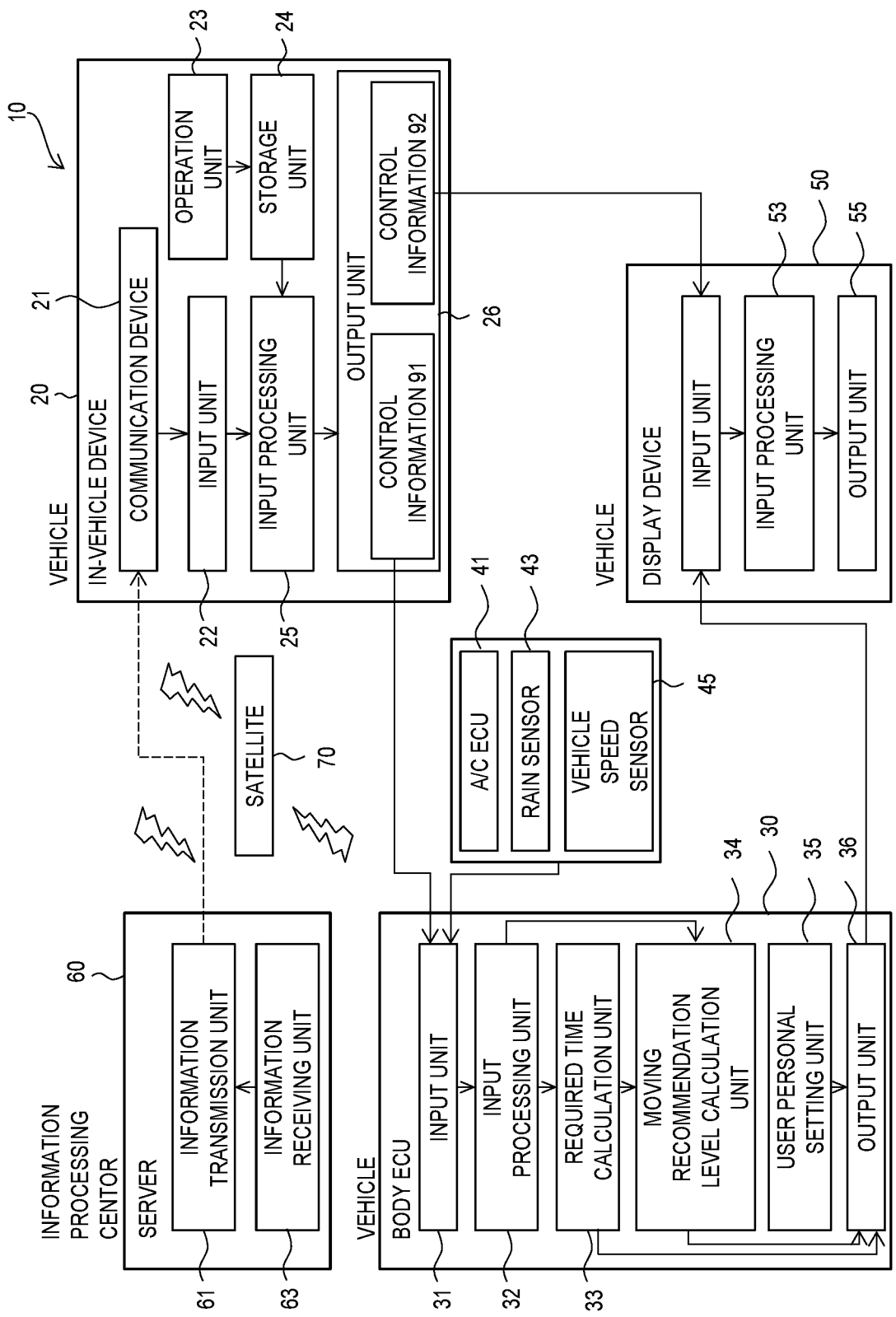
FIG. 2 is a system configuration diagram of the vehicle navigation device.

FIG. 2 is a system configuration diagram of the vehicle navigation device 10. As shown in FIG. 2, the vehicle navigation device 10 includes an in-vehicle device 20 that exchanges information with a server 60 or a satellite 70 outside the vehicle 1, a body ECU 30, a display device 50 that displays various kinds of information, an A/C ECU 41, a rain sensor 43, and a vehicle speed sensor 45. The in-vehicle device 20, the body ECU 30, the display device 50, the A/C ECU 41, the rain sensor 43, and the vehicle speed sensor 45 are all mounted on the vehicle 1.

In-Vehicle Device

The in-vehicle device 20 is a so-called car navigation system, and includes a communication device 21, an input unit 22, an operation unit 23, a storage unit 24, an input processing unit 25, and an output unit 26, as shown in FIG. 2. Hereinafter, the in-vehicle device 20 will also be referred to as a car navigation system 20.

The communication device 21 is, for example, a data communication module (DCM), and receives a signal from the satellite 70 to acquire current location information of the vehicle 1. In an information processing center outside the vehicle 1, a cloud environment in which the communication device 21 is accessible is constructed. The communication device 21 receives from an information transmission unit 61 of the server 60 the weather information or the outside temperature information, which is received by an information receiving unit 63 of the server 60, provided in the information processing center, from the satellite 70. The communication device 21 transmits, for example, the current location information, weather information, and outside temperature information to the input unit 22 (input interface).

The operation unit 23 acquires, for example, destination location information and waypoint location information by an input operation of the destination and the waypoint by the user of the vehicle 1, and transmits the destination position information and the waypoint location information to the storage unit 24. Accordingly, in the present embodiment, the car navigation system 20 is an example of the "acquisition unit configured to acquire the destination" in claims.

The storage unit 24 is a storage medium that stores various kinds of information, stores, for example, a map information database, and also stores the destination location information and the waypoint location information transmitted from the operation unit 23.

The input processing unit 25 acquires the current location information of the vehicle 1, the weather information and the outside temperature information from the input unit 22, and also acquires, for example, the destination location information, the waypoint location information, distance information to the destination, height difference information to the destination from the storage unit 24. The input processing unit 25 converts the weather information and the outside temperature information into information available in the body ECU 30, and also converts the distance information to the destination and the height difference information to the destination into a required time Tv taking to arrive at the destination by the vehicle 1 and direction information. The input processing unit 25 transmits the weather information, the outside temperature information, the required time Tv, and the direction information to the destination, which have been converted, to the output unit 26.

The output unit 26 outputs the weather information, the outside temperature information, and the required time Tv as control information 91 to the body ECU 30, and outputs the direction information to the destination as control information 92 to the display device 50.

Body ECU

The body ECU (display control unit) 30 includes, as shown in FIG. 2, an input unit 31, an input processing unit 32, a required time calculation unit 33, a moving recommendation degree calculation unit 34, a user personal setting unit 35 and an output unit 36, and is configured to control the information displayed on the display device 50 based on the destination input to the operation unit 23 of the car navigation system 20.

As described above, in addition to the control information 91 from the output unit 26 of the car navigation system 20, as described above, the outside temperature information from the A/C ECU 41, raindrop detection information from the rain sensor 43, and vehicle speed information from the vehicle speed sensor 45 are input to the input unit 31 (input interface). Further, in addition to wide-area weather information, such as the outside temperature information and the weather information from the information processing center, the outside temperature information from the A/C ECU 41 and the raindrop detection information from the rain sensor 43 can be acquired to refer to the weather information in vicinity of the vehicle 1 upon calculating the degree of recommendation, as will be described below. The input unit 31 transmits the weather information, the outside temperature information (for wide area), the required time Tv, the outside temperature information (in the vicinity of the vehicle 1), the raindrop detection information, the vehicle speed information and the like to the input processing unit 25.

The input processing unit 25 converts the weather information, the outside temperature information (for wide area), the required time Tv, the outside temperature information (in the vicinity of the vehicle 1), the raindrop detection information, the vehicle speed information, and the like, into information available in the required time calculation unit 33 and the moving recommendation degree calculation unit 34, thereby outputting the converted information to the required time calculation unit 33 and the moving recommendation degree calculation unit 34.

The required time calculation unit 33 calculates the required times Tb and Th taking to arrive at the destination by the form of transportation after the user alights from the vehicle on the assumption that the user gets off at the current location. In particular, the required time calculation unit 33 converts the required time Tv taking to arrive at the destination by the vehicle 1 into, for example, a required time when the user moves by bicycle or by walking, to calculate the required time Tb taking to arrive at the destination by bicycle and the required time Th taking to arrive at the destination by walking, thereby transmitting the calculated required times Tb and Th to the moving recommendation degree calculation unit 34 and the output unit 36.

The moving recommendation degree calculation unit 34 calculates the recommendation degree for moving from the current location to the destination by the form of transportation after the user alights from the vehicle, based on at least the weather information. In particular, the moving recommendation degree calculation unit 34 calculates the degree of recommendation for moving from the current location to the destination by walking, based on the weather information, the outside temperature information (for wide area), the outside temperature information (in the vicinity of the vehicle 1), the raindrop detection information, the required time Th calculated by the required time calculation unit 33, and the like. The calculated degree of recommendation is transmitted to the output unit 36.

The output unit 36 outputs the required times Tb and Th and the degree of recommendation to the display device 50. The user of the vehicle 1 can customize by operating the user personal setting unit 35 whether to display, for example, the required times Tb and Th, and the degree of recommendation on the display device 50. In a case where the user selects not to display, the required times Tb and Th, and the degree of recommendation are not displayed on the display device 50.

Display Device

In the present embodiment, a head-up display system is employed as the display device 50. As shown in FIG. 2, the display device (display unit) 50 includes an input unit 51, an input processing unit 53, and an output unit 55.

The direction information to the destination is input to the input unit 51 (input interface) as the control information 92 from the output unit 26 of the car navigation system 20, while the required times Tb and Th are input from the output unit 36 of the body ECU 30 together with the degree of recommendation (color information).

The input processing unit 53 converts the direction information to the destination, the required times Tb and Th, and the degree of recommendation into the alighting guidance information 11 available in the output unit 55, and outputs the converted information to the output unit 55. In particular, as shown in FIG. 1, the input processing unit 53 converts the direction information to the destination into the arrow 13, the required times Tb and Th into the balloon image 15, and the degree of recommendation into the colored (hatched in FIG. 1) arrow 13, and outputs them to the output unit 55.

The output unit 55 is a head-up display installed at the bottom of the windshield 3, whereby the user who is driving can recognize the alighting guidance information 11 while keeping his/her line of sight at the front. Hereinafter, the display device 50 or the output unit 55 is also referred to as the head-up display 55.

Alighting Guidance Information

The alighting guidance information 11 displayed on the head-up display 55 by the body ECU 30 will be described in detail.

Conditions for Display

The condition for displaying the alighting guidance information 11 on the head-up display 55 is that the user inputs the destination via the operation unit 23 of the car navigation system 20.

Furthermore, in a case where the body ECU 30 determines that the current location of the vehicle 1 is within a predetermined radius (for example, 5 km) from the destination based on the distance information to the destination acquired from the car navigation system 20, the alighting guidance information 11 may be displayed on the head-up display 55.

However, even in a case where it is determined that the current location of the vehicle 1 is within the predetermined radius from the destination, it does not mean the alighting guidance information 11 is always displayed. The body ECU 30 is configured to display the alighting guidance information 11 on the head-up display 55 only when the vehicle speed is less than the predetermined speed (when the vehicle is parked, is stopped, or travels at a speed less than the predetermined speed (5 km/h in the present embodiment)).

Accordingly, when the vehicle slowly travels at a speed less than 5 km/h, such as when the vehicle is parked, is stopped while waiting for a signal, or is slowly driven while searching for the parking space, the alighting guidance information 11 is displayed. Therefore, the user can quickly and easily determine whether to use the parking space found while waiting for a signal or driving slowly.

Meanwhile, when the vehicle travels at a high speed equal to or more than 5 km/h, that is, when the user does not search for the parking space, the alighting guidance information 11 is not displayed. Therefore, the user is less likely to become frustrated with the unnecessary information displayed.

Display Modes

When the vehicle is driven (when the vehicle is stopped and when the vehicle travels), it is necessary to display various kinds of information, including a pedestrian detection image 81 and an instrument image 83 illustrating information on vehicle travel control, on the head-up display 55 in addition to the alighting guidance information 11, as shown in FIG. 1. Nevertheless, if the alighting guidance information 11 occupies a large part of the head-up display 55, it may be difficult to display other information or to see other information. This problem does not occur in the head-up display 55 only, but in a case where the output unit 55 of the display device 50 is, for example, a display of the car navigation system 20 or a display of a combination meter.

Figure 3:
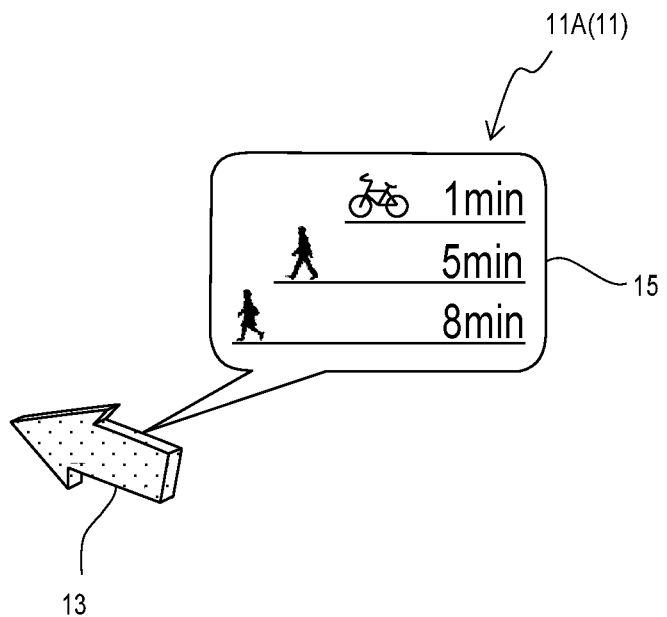
FIG. 3 is a diagram schematically illustrating a normal display mode of post-alighting guidance information.
Figure 4:
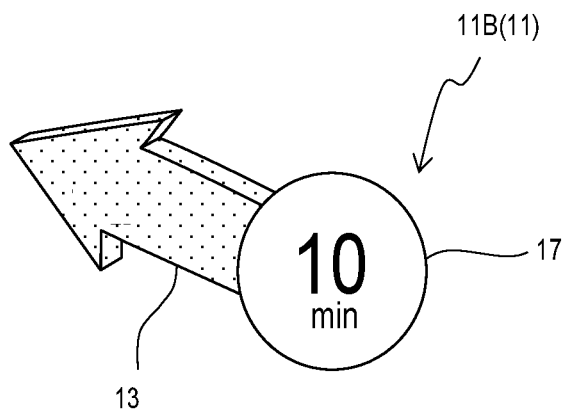
FIG. 4 is a diagram schematically illustrating a simple display mode of the post-alighting guidance information.

In the present embodiment, display modes of the alighting guidance information 11 includes the normal display mode 11A (as shown in FIG. 3) and the simple display mode 11B (as shown in FIG. 4) for displaying information with smaller data amount than that displayed in the normal display mode 11A. The body ECU 30 is configured to display the alighting guidance information 11 in the normal display mode 11A on the head-up display 55 when the vehicle is parked, and to display the alighting guidance information 11 in the simple display mode 11B on the head-up display 55 when the vehicle is stopped or travels at a speed less than the predetermined speed.

More specifically, in the normal display mode 11A, as shown in FIG. 3, the balloon image 15 indicating the required times Tb and Th, the arrow 13 indicating the direction from the current location to the destination, and the color of the arrow 13 indicating the degree of recommendation are displayed as the alighting guidance information 11. The normal display mode 11A includes a mode in which the alighting guidance information 11 is displayed according to the form of transportation, such as bicycle or walking, and according to the user's age such as walking adults or walking with children. In particular, the required time Tb taking to arrive at the destination from the current location by bicycle is displayed in the upper part of the balloon image 15, the required time Th taking to arrive at the destination from the current location by walking (adults) in the middle of the balloon image 15, and the required time Th taking to arrive at the destination from the current location by walking (with children) in the lower part of the balloon image 15.

The required times taking to arrive at the destination from the current location are displayed for each of cases where the form of transportation is the bicycle and walking. Therefore, the user can select the parking space more accurately. Further, the required times taking to arrive at the destination from the current location by walking are displayed for adults and children, thus the user is less likely to select the parking space within the optimal distance for adults but extremely far from the destination for children.

On the other hand, in the simple display mode 11B, as shown in FIG. 4, an image 17 encircling the required time Th taking to arrive at the destination by walking (adults), the arrow 13 indicating the direction from the current location to the destination, and the color of the arrow 13 indicating the degree of recommendation are displayed as the alighting guidance information 11.

Accordingly, when the vehicle is stopped or when the vehicle travels at a speed less than the predetermined speed, the alighting guidance information 11 is displayed in the simple display mode 11B in which the displayed information has relatively smaller data amount. Therefore, the user does not become frustrated by a difficulty in seeing the other information and while displaying the information that can be referred to by the user when the user determines the parking space. On the other hand, the alighting guidance information 11 is displayed in the normal display mode 11A, in which the displayed information has relatively larger data amount, when the vehicle is parked, that is, when the other information is less required to be displayed. Thus the user can easily determine whether to use the found parking space or not while the user can be surely helped to get to his/her destination without getting lost after the user gets off the vehicle.

Method of Calculating Degree of Recommendation

In the vehicle navigation device 10 of the present embodiment, as described above, the degree of recommendation for moving from the current location to the destination by walking, which is calculated based on at least the weather information, is displayed by the color of the arrow 13. Then, the color of the arrow 13 is blue in a case where the degree of recommendation is high and "you (the user) can walk without worries", and yellow in a case where the degree of recommendation is medium and "you (the user) should be careful when walking", and red in a case where the degree of recommendation is low and "walking is not recommended." In FIGS. 5 and 6, blue is represented by dot hatching, yellow is represented by diagonal hatching, and red is represented by cross hatching.

FIG. 5 is a chart illustrating one example of factors to be considered upon calculating the degree of recommendation. As shown in FIG. 5, the factors to be considered upon calculating the degree of recommendation include not only the weather information such as outside temperature and weather, but also the distance (approximately equal to required time) from the current location to the destination. For example, in a case where the outside temperature is 40° C. and the distance from the current location to the destination is 5 km (the required time is 40 minutes) as in a first column from the left, the burden on the user after getting off is large. Thus, the red arrow 13 indicating that "walking is not recommended" is displayed as the degree of recommendation.

For example, in a case where the outside temperature is 25° C. and the distance from the current location to the destination is 1 km (the required time is 13 minutes), as in first and second columns from the right, the degree of recommendation for the second column from the right is the blue arrow 13 indicating that "you (the user) can walk without worries", while the degree of recommendation for the first column from the right is the yellow arrow 13 indicating that "you (the user) should be careful when walking" since it is a rainy day.

How to evaluate the outside temperature, weather and distance selected as the factors to be considered to calculate the degree of recommendation will be described with reference to FIG. 6, which is a table illustrating one example of a method of calculating the degree of recommendation. In the vehicle navigation device 10 of the present embodiment, a point system is employed as the method of calculating the degree of recommendation as shown in FIG. 6.

More specifically, in a case of the outside temperature, for example, a range from 11° C. to 27° C. (strictly, higher than 10° C. and lower than 28° C.) is defined as 5 points in blue (represented by dot hatching), which indicates the high degree of recommendation. A range from below freezing point to 10° C. and a range from 28° C. or higher are defined as 0 point in red (represented by cross hatching), which indicates the low degree of recommendation.

Regarding the weather, for example, fine day in spring, autumn or winter, and cloudy day in spring, summer and autumn are defined as 5 points in blue, which indicates the high degree of recommendation, cloudy day in wither is defined as 3 points in yellow, which indicates the medium degree of recommendation, and rainy day or fine day in summer is defined as 0 point in red, which indicates the low degree of recommendation.

Furthermore, regarding the distance from the current location to the destination, for example, less than 1 km is defined as 5 points in blue, which indicates the high degree of recommendation, a range of 1 km or more and less than 3 km is defined as 3 points in yellow, which indicates the medium degree of recommendation, and 3 km or more is defined as 0 point in red, which indicates the low degree of recommendation.

If the total of points allocated to the outside temperature, weather and distance is 13 points or higher, blue is determined as the degree of recommendation; if it falls within a range of 6 to 12 points, yellow is determined as the degree of recommendation; and if it is less than or equal to 5 points, red is determined as the degree of recommendation.

As described above, in the vehicle navigation device 10 according to the present embodiment, the degree of recommendation calculated based on the weather, the outside temperature and the distance is also displayed as the alighting guidance information 11 is represented by the color of the arrow 13. Thus, the user can further easily determine whether to use the found parking space.

Furthermore, since the degree of recommendation is represented by different colors, the user can intuitively recognize the degree of recommendation even when he/she drives while searching the parking space, which enables the user to further easily determine whether to use the found parking space.

Display Process Procedure

Figure 7:
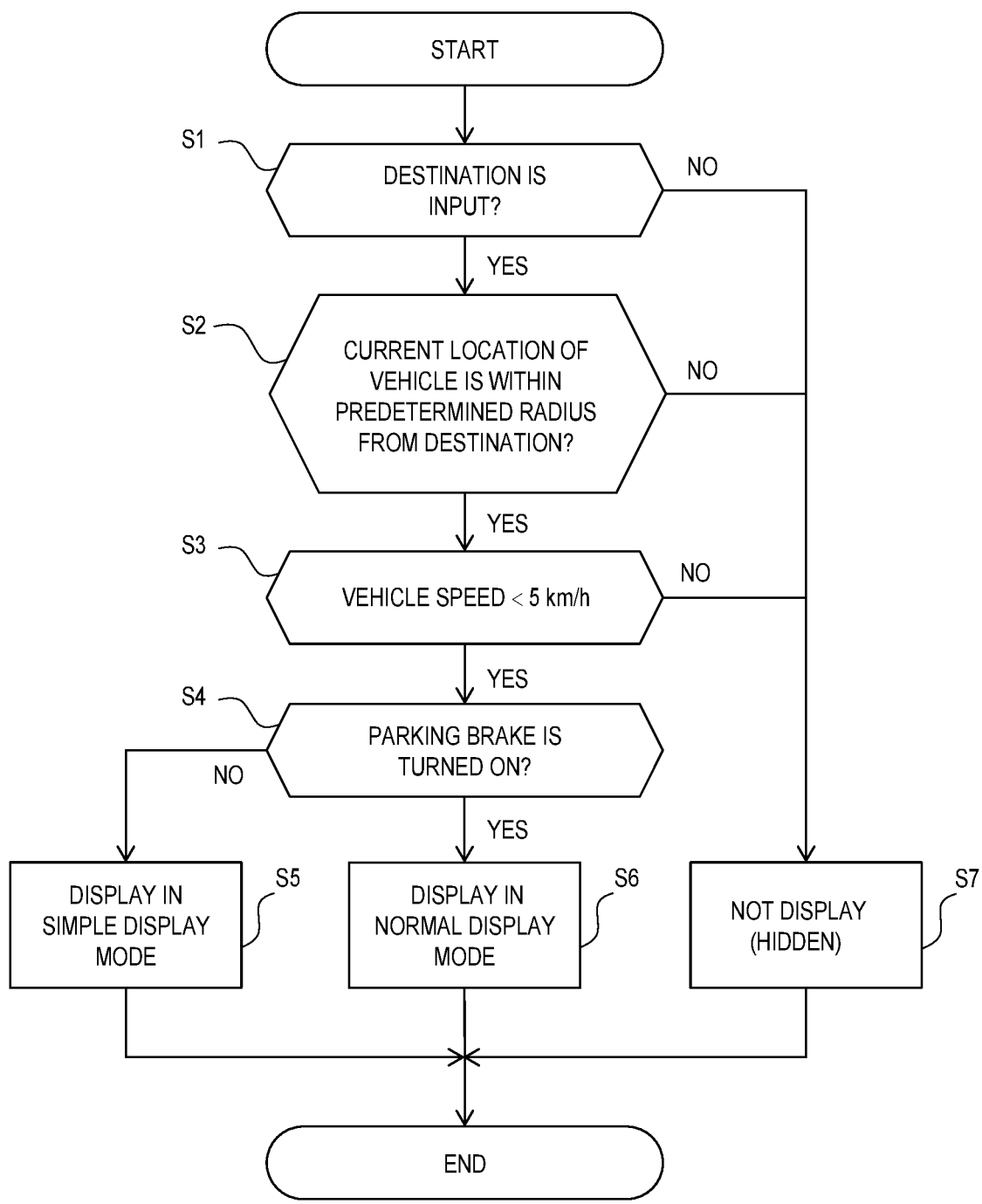
FIG. 7 is a flowchart illustrating a procedure of a display process performed by the vehicle navigation device.

Next, a display process procedure of the alighting guidance information 11 will be described using a flow chart. FIG. 7 is a flowchart illustrating a flow of a process performed by the vehicle navigation device 10. The process shown in the flowchart of FIG. 7 is repeatedly executed at predetermined time intervals during one trip (between when the ignition turns on and when the ignition turns off).

First, in step S1, the body ECU 30 determines whether the destination is input. In a case where the determination is negative (NO) in step S1, the process proceeds to step S7. The alighting guidance information 11 is hidden, and then the process ends. On the other hand, in a case where the determination is positive (YES) in step S1, the process proceeds to step S2.

In step S2, the body ECU 30 determines whether the current location of vehicle 1 is within a predetermined radius from the destination. In a case where the determination is negative (NO) in step S2, the process proceeds to step S7. The alighting guidance information 11 is hidden, and then the process ends. On the other hand, in a case where the determination is positive (YES) in step S2, the process proceeds to step S3.

In step S3, the body ECU 30 determines whether the vehicle speed of the vehicle 1 is less than 5 km/h based on the vehicle speed information from the vehicle speed sensor 45. In a case where the determination is negative (NO) in step S3, that is, in a case where the vehicle travels at a high speed equal to or more than 5 km/h, the process proceeds to step S7. The alighting guidance information 11 is hidden, and then the process ends. On the other hand, in a case where the determination is positive (YES) in step S3, the process proceeds to step S4.

In step S4, the body ECU 30 determines whether a parking brake is turned on. In a case where the determination is negative (NO) in step S4, that is, in a case where the vehicle 1 is stopped or travels at a speed less than 5 km/h, the process proceeds to step S5. The alighting guidance information 11 is displayed in the simple display mode 11B, and then the process ends.

In a case where the determination is positive (YES) in step S4, that is, in a case where the vehicle 1 is parked, the process proceeds to step S6. The alighting guidance information 11 is displayed in the normal display mode 11A, and then the process ends.

Scene where Vehicle Navigation Device is Used

Figure 8:
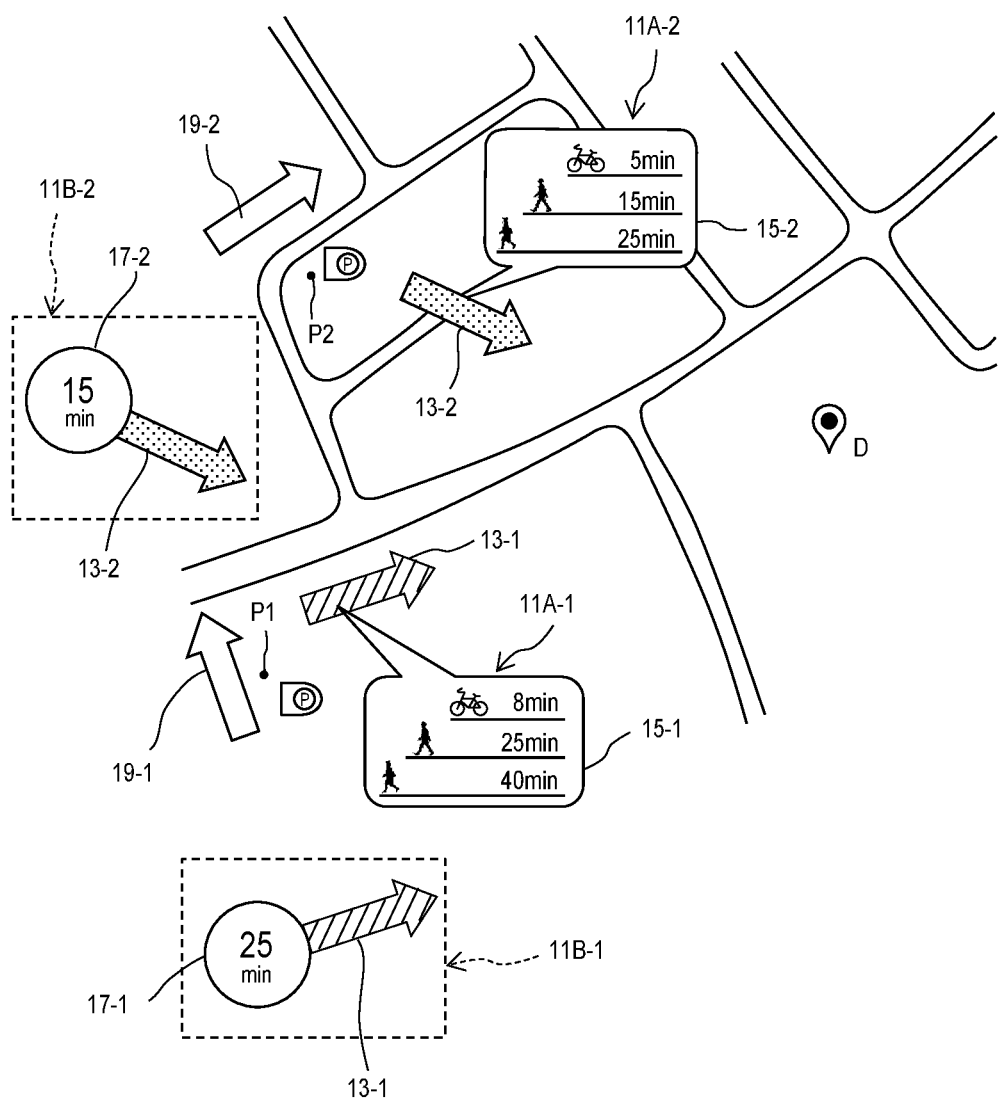
FIG. 8 is a diagram schematically illustrating a scene where the vehicle navigation device is used.

Next, a scene where the vehicle navigation device 10 that displays the alighting guidance information 11 is used will be described. FIG. 8 is a diagram schematically illustrating a scene where the vehicle navigation device 10 is used. In FIG. 8, it is assumed that the user of the vehicle 1 operates the operation unit 23 of the car navigation system 20 to input a destination D, and arrives at the destination D, however, since the parking space of the destination D is not vacant, the user travels around the destination to find another parking space.

In such a case, the conventional navigation system has a problem that, in a case where the user is not acquainted with the place, it is difficult for the user to determine the parking space and that it is difficult for the user to decide whether to use the parking space, or the user cannot know a direction in which he/she should go after getting off the vehicle, since the guidance information including the required time taking to arrive at the destination to the found parking space and the direction from the found parking space to the destination is not presented to the user. Furthermore, in such a case, the conventional navigation system has a problem that the user has to take out the portable terminal every time when he/she newly inputs information on the parking space found by him/her or scrolls the map in order to acquire the guidance information from such a parking space to the destination D, thereby the user may become frustrated.

Meanwhile, in the vehicle navigation device 10 of the present embodiment, as described above, it is possible to help the user by displaying the alighting guidance information 11, which is the guidance information for guiding to the destination regarding, for example, walking after the user gets off, on the head-up display 55.

Specifically, in a case where the user travels around the destination to find another parking space and finds out a coin parking lot P1 as shown in FIG. 8, in addition to vehicle guidance information 19-1, the alighting guidance information 11 is displayed in a simple display mode 11B-1 on the head-up display 55 as surrounded by a box of broken line. More specifically, on the assumption that the user gets off at the current location (in the vicinity of the coin parking lot P1), an image 17-1 encircling the required time Th (25 minutes) taking to arrive at the destination by walking (adults), the direction from the current location to the destination, and a yellow arrow 13-1 indicating that "you (the user) should be careful when walking", which indicates the medium degree of recommendation, are displayed as the alighting guidance information 11.

If the user for whom the information that is helpful in determining the parking space is shown determines that, for example, "it is difficult even for an adult to walk for 25 minutes. I'll find another parking space", another parking space will be further searched for.

If the user enters the coin parking lot P1 and turns on the parking brake, in addition to the vehicle guidance information 19-1, the alighting guidance information 11 is displayed in a normal display mode 11A-1 on the head-up display 55. More specifically, on the assumption that the user gets off at the current location (in the vicinity of the coin parking lot P1), a balloon image 15-1 encircling the required times Tb and Th taking to arrive at the destination by bicycle and by walking, the direction from the current location to the destination, and the yellow arrow 13-1 indicating that "you (the user) should be careful when walking", which indicates the medium degree of recommendation, are displayed as the alighting guidance information 11 on the head-up display 55.

In this case, the user who has entered the coin parking lot P1 knows from the alighting guidance information 11 displayed on the head-up display 55 that it takes 40 minutes by walking from the coin parking lot P1 to the destination D in a case where he/she is with children. Accordingly, the user can determine that, for example, "I've found a coin parking lot, but it is difficult for my children to walk. I'll find another parking space". Thus the user is less likely to select the coin parking lot P1 extremely far from the destination D.

Meanwhile, in a case where the user finds out a coin parking lot P2 as shown in FIG. 8, in addition to vehicle guidance information 19-2, the alighting guidance information 11 is displayed in a simple display mode 11B-2 on the head-up display 55 as surrounded by a box of broken line. More specifically, on the assumption that the user gets off at the current location (in the vicinity of the coin parking lot P2), an image 17-2 encircling the required time Th (15 minutes) taking to arrive at the destination by walking (adults), the direction from the current location to the destination, and a blue arrow 13-2 indicating that "you (the user) can walk without worries", which indicates the high degree of recommendation, are displayed as the alighting guidance information 11.

If the user enters the coin parking lot P2 and turns on the parking brake, in addition to the vehicle guidance information 19-2, the alighting guidance information 11 is displayed in a normal display mode 11A-2 on the head-up display 55. More specifically, on the assumption that the user gets off at the current location (in the vicinity of the coin parking lot P2), a balloon image 15-2 encircling the required times Tb and Th taking to arrive at the destination by bicycle and by walking, the direction from the current location to the destination, and a blue arrow 13-2 indicating that "you (the user) can walk without worries", which indicates the high degree of recommendation, are displayed as the alighting guidance information 11 on the head-up display 55.

In this case, the user knows from the alighting guidance information 11 displayed on the head-up display 55 that it takes only 25 minutes by walking from the coin parking lot P2 to the destination D in a case where he/she is with children. Accordingly, the user can determine that, for example, "I and my children can walk this distance. I'll park in this coin parking lot". Thus the user can select the coin parking lot P2 that is not far from the destination D. Additionally, the alighting guidance information 11 includes the arrow 13-2 indicating the direction from the current location to the destination D, thus the user is less likely to head in a wrong direction after getting off the vehicle even in a case where he/she is not acquainted with the place around the destination.

As described above, in the present embodiment, since the alighting guidance information 11 is displayed on the head-up display 55, the user can easily determine whether to use the parking space found out during the travel and it is possible to help the user to arrive at the destination without getting lost after the user gets off the vehicle, even in a case where he/she is not acquainted with the place around the destination.

Moreover, such alighting guidance information 11 is displayed on the head-up display 55 without requiring the operation by the user, thus it is not necessary to take out the portable terminal while he/she drives the vehicle, whereby annoying felt by the user can be suppressed.

Other Embodiments

The present disclosure is not limited to the embodiments, and can be implemented in various other forms without departing from the scope or the essential features thereof.

In the embodiment stated above, the normal display mode 11A is configured to display the alighting guidance information 11 regarding bicycles and walking. However, the present disclosure is not limited thereto; for example, the alighting guidance information regarding the wheelchairs or the small moving vehicles, such as Ultra Lightweight Vehicles shown in FIG. 1 may be displayed.

Further, in the embodiment stated above, the degree of recommendation is represented by the color of the arrow 13, but the present disclosure is not limited thereto. The degree of recommendation may be represented by, for example, the color of the balloon image 15.

Furthermore, in the embodiment stated above, the distance (required time) from the current location to the destination is referred to as the factor to be considered upon calculating the degree of recommendation, in addition to the climate such as the outside temperature and the weather, but the present disclosure is not limited thereto. For example, the user's age, the form of transportation after the user alights from the vehicle, the humidity and the amount of solar radiation may be referred to as the factors to be considered upon calculating the degree of recommendation.

Further, in the embodiment stated above, the alighting guidance information 11 is displayed in the normal display mode 11A during parking, while the alighting guidance information 11 is displayed in the simple display mode 11B when the vehicle is stopped or travels at a speed less than the predetermined speed. Although the body ECU 30 is configured as described above, the present disclosure is not limited thereto. For example, the body ECU 30 may be configured such that the alighting guidance information 11 is displayed only in the normal display mode 11A or in the simple display mode 11B regardless of whether the vehicle is parked, is stopped, or travels at a speed less than the predetermined speed.

Further, in the embodiment stated above, the head-up display 55 displays the alighting guidance information 11. However, the present disclosure is not limited thereto. For example, the alighting guidance information 11 may be displayed on the display of the car navigation system 20 or the display of the combination meter provided on the instrument panel.

Further, in the embodiment stated above, the car navigation system 20 is employed as the acquisition unit that acquires the destination, but the disclosure is not limited thereto. For example, the portable terminal, may be employed as the acquisition unit.

As described above, the embodiments stated above are merely examples in all respects, and should not be interpreted limitedly. Furthermore, all modifications and changes falling within a scope equivalent to claims are within the scope of the present disclosure.

According to the present disclosure, the present disclosure can be advantageously applied to the vehicle navigation device that guides the vehicle user to the destination, since it enables the user to easily determine the parking space without feeling frustrated and can help the user to get to his/her destination without getting lost after getting off the vehicle even in a case where the user is not acquainted with the place around the destination.

What is claimed is:

1. A vehicle navigation device that guides a user of a vehicle to a destination, the vehicle navigation device comprising:
   a processor programmed to function as an acquisition unit configured to acquire the destination;
   a display; and
   an electronic control unit configured to function as a display control unit that is configured to control the display based on the destination acquired by the acquisition unit, the display control unit, the acquisition unit and the display being in-vehicle devices, and wherein the display control unit is configured to cause, on an assumption that the user alights at a current location, the display to display post-alighting guidance information that is information for guiding the user to the destination regarding a form of transportation after the user alights from the vehicle, and the display control unit is configured to cause the display to display the post-alighting guidance information before the vehicle is parked, wherein the post-alighting guidance information includes a direction from the current location to the destination, the destination being located outside a parking space, wherein the display control unit is further configured to control the display to display, at a same time, (a) first post-alighting guidance information corresponding to a first age of a potential user and (b) second post-alighting guidance information corresponding to a second age of another potential user, the second age being different from the first age, and wherein the display control unit is further configured to control the display to display information of the first age and information of the second age, and the first post-alighting guidance information and the second post-alighting guidance information, on the display in a manner showing a relation to each other, respectively.

2. The vehicle navigation device according to claim 1, wherein the post-alighting guidance information further includes at least a time required to arrive at the destination from the current location by the form of transportation.

3. The vehicle navigation device according to claim 1, wherein the display control unit is configured to cause the display to display the post-alighting guidance information when a speed of the vehicle is less than a predetermined speed.

4. The vehicle navigation device according to claim 1, wherein the post-alighting guidance information further includes a degree of recommendation for moving from the current location to the destination by the form of transportation.

5. The vehicle navigation device according to claim 4, wherein the degree of recommendation is calculated based on at least weather information.

6. The vehicle navigation device according to claim 4, wherein the degree of recommendation includes a plurality of degrees of recommendations for moving from the current location to the destination by the form of transportation, and the display control unit is configured to cause the display to display different ones of the plurality of degrees of recommendations using different colors.

7. The vehicle navigation device according to claim 1, wherein the display control unit is configured to further cause the display to display information for guiding the user to the destination regarding the vehicle.

8. The vehicle navigation device according to claim 1, wherein:
display modes of the post-alighting guidance information include a normal display mode and a simple display mode, the simple display mode being a display mode that displays the post-alighting guidance information with a smaller amount of data than the post-alighting guidance information displayed in the normal display mode; and
the display control unit is configured to:
when the vehicle is parked, cause the display to display the post-alighting guidance information in the normal display mode; and
when the vehicle is stopped or travels at a speed less than a predetermined speed, cause the display to display the post-alighting guidance information in the simple display mode.

9. The vehicle navigation device according to claim 8, wherein the normal display mode includes a mode that displays the post-alighting guidance information according to the form of transportation.

10. The vehicle navigation device according to claim 1, wherein the display control unit is configured to cause the display to display the post-alighting guidance information at a timing when it is determined that the current location of the vehicle is within a predetermined radius from the destination.

11. The vehicle navigation device according to claim 1, wherein the display is a head-up display.

12. A vehicle navigation device that guides a user of a vehicle to a destination, the vehicle navigation device comprising:
a processor programmed to function as an acquisition unit configured to acquire the destination;
a display; and
an electronic control unit configured to function as a display control unit that is configured to control the display based on the destination acquired by the acquisition unit, the display control unit, the acquisition unit and the display being in-vehicle devices, and
wherein the display control unit is configured to cause, on an assumption that the user alights at a current location, the display to display post-alighting guidance information that is information for guiding the user to the destination regarding a form of transportation after the user alights from the vehicle,
wherein the post-alighting guidance information includes a direction from the current location to the destination, and
wherein the display control unit is configured to display the post-alighting guidance information along with information for guiding the user to the destination regarding the vehicle on the display at a timing when the vehicle is traveling at a speed less than a predetermined speed, before the vehicle is parked.

* * * * *